US012248756B2

United States Patent
Hamilton et al.

(10) Patent No.: US 12,248,756 B2
(45) Date of Patent: Mar. 11, 2025

(54) CREATING PREDICTOR VARIABLES FOR PREDICTION MODELS FROM UNSTRUCTURED DATA USING NATURAL LANGUAGE PROCESSING

(71) Applicant: EQUIFAX INC., Atlanta, GA (US)

(72) Inventors: Howard Hugh Hamilton, Atlanta, GA (US); Terry Woodford, Kennesaw, GA (US)

(73) Assignee: Equifax Inc., Atlanta, GA (US)

( * ) Notice: Subject to any disclaimer, the term of this patent is extended or adjusted under 35 U.S.C. 154(b) by 296 days.

(21) Appl. No.: 17/758,276

(22) PCT Filed: Dec. 28, 2020

(86) PCT No.: PCT/US2020/067185
§ 371 (c)(1),
(2) Date: Jun. 30, 2022

(87) PCT Pub. No.: WO2021/138271
PCT Pub. Date: Jul. 8, 2021

(65) Prior Publication Data
US 2023/0023630 A1    Jan. 26, 2023

Related U.S. Application Data

(60) Provisional application No. 62/955,100, filed on Dec. 30, 2019.

(51) Int. Cl.
*G06F 40/40* (2020.01)
*G06F 17/18* (2006.01)
(Continued)

(52) U.S. Cl.
CPC ............ *G06F 40/40* (2020.01); *G06F 40/284* (2020.01); *G06F 40/295* (2020.01)

(58) Field of Classification Search
CPC ........ G06F 40/40; G06F 40/30; G06F 40/295; G06N 20/00; G06N 5/04
See application file for complete search history.

(56) References Cited

U.S. PATENT DOCUMENTS

2014/0316768 A1*  10/2014  Khandekar ......... G06F 16/3329
                                                              704/9
2018/0025273 A1*  1/2018   Jordan ................... G06N 3/082
                                                              706/21
(Continued)

FOREIGN PATENT DOCUMENTS

WO    2016160539 A1    10/2016
WO    2018084867 A1    5/2018

OTHER PUBLICATIONS

Bach, M. Pejić, et al. "Selection of variables for credit risk data mining models: preliminary research." 2017 40th International Convention on Information and Communication Technology, Electronics and Microelectronics (MIPRO). IEEE, 2017. (Year: 2017).*

(Continued)

*Primary Examiner* — Jialong He
(74) *Attorney, Agent, or Firm* — Kilpatrick Townsend & Stockton LLP

(57) ABSTRACT

Systems and methods for creating predictor variables from unstructured data for prediction models are provided. A variable creation application receives unstructured data and processing the unstructured data to generate processed data. Based on the processed data, the variable creation application generates an attribute pool that contains multiple predictor variables generated by applying natural language processing (NLP) procedures on the processed data. The variable creation application further executes a prediction model on at least the predictor variables in the attribute pool to generate a prediction result. Based on the prediction result, the variable creation application evaluates the pre- (Continued)

dictive power of each of the predictor variables and retains predictor variables that are predictive as input predictor variables for the prediction model.

20 Claims, 5 Drawing Sheets

(51) Int. Cl.
    *G06F 40/284* (2020.01)
    *G06F 40/295* (2020.01)
    *G06N 20/00* (2019.01)

(56) References Cited

U.S. PATENT DOCUMENTS

| | | | |
|---|---|---|---|
| 2018/0075175 A1* | 3/2018 | Chang | G06F 17/18 |
| 2019/0114370 A1* | 4/2019 | Cerino | G06F 40/14 |
| 2019/0205771 A1 | 7/2019 | Lin et al. | |
| 2019/0304582 A1 | 10/2019 | Blumenthal et al. | |
| 2019/0340526 A1* | 11/2019 | Turner | G06N 3/04 |

OTHER PUBLICATIONS

Gahlaut, Archana, and Prince Kumar Singh. "Prediction analysis of risky credit using Data mining classification models." 2017 8th international conference on computing, communication and networking technologies (ICCCNT). IEEE, 2017 (Year: 2017).*

PCT/US2020/067185, "International Preliminary Report on Patentability", Jul. 14, 2022, 9 pages.

PCT/US2020/067185, "International Search Report and Written Opinion", Mar. 23, 2021, 13 pages.

Canadian Application No. CA3,163,408, Office Action, Mailed On Jan. 16, 2024, 6 pages.

* cited by examiner

CREATING PREDICTOR VARIABLES FOR PREDICTION MODELS FROM UNSTRUCTURED DATA USING NATURAL LANGUAGE PROCESSING

CROSS-REFERENCE TO RELATED APPLICATIONS

This claims priority to U.S. Provisional Application No. 62/955,100, entitled "Creating Predictor Variables for Prediction Models from Unstructured Data Using Natural Language Processing," filed on Dec. 30, 2019, which is hereby incorporated in its entirety by this reference.

TECHNICAL FIELD

The present disclosure relates generally to artificial intelligence. More specifically, but not by way of limitation, this disclosure relates to using natural language processing to generate predictor variables for prediction models based on unstructured data.

BACKGROUND

Prediction models, such as a neural network model for predicting a risk associated with an entity, generate prediction results based on input attributes, also referred to herein as predictor variables. One of the factors that impact the performance of a prediction model is the quality of the input predictor variables. More accurate prediction results can be generated if predictor variables with higher predictive power (i.e., having more influence on the prediction results) can be selected for the prediction model. To select predictor variables with high predictive power, various data associated with a target entity or object for which the prediction is to be performed are gathered to extract predictor variables. For example, the prediction model can be configured for predicting whether a user will use online computing resources (e.g., virtual machines and storage spaces) more than what is allocated to him so as to estimate the total number of users the resource provider can service. In this example, the log data containing the user's past usage information of the online computing resources (e.g., the number of occurrences of the over usages of computing resources, the amount of over usages, the duration of each over usage, etc.) can be used to as predictor variables.

Except for the structured data such as the resource usage log data, there might be various other types of unstructured data associated with the target entity or object that can contain valuable information and be utilized to generate predictor variables. Unstructured data is information that either does not have a pre-defined data model or is not organized in a pre-defined manner. Continuing the above example, unstructured data associated with the user can include a transcript of service calls made by the user to the resource provider customer service, or emails or other correspondence between the user and customer service representatives. These types of data may contain valuable information such as whether the user has asked questions related to requesting additional computing resources exceeding his allocation, whether the user has actually requested the increase, how many times or how often the user has asked for such an increase, etc.

Extracting predictor variables from these unstructured data typically involves human operations such as reviewing the unstructured data, understanding the content, and extracting the relevant predictor variables. This is a time-consuming process and error-prone. As such, the existing prediction models have not taken advantage of the valuable information contained in the unstructured data and the prediction accuracies of the prediction models are thus limited.

SUMMARY

Various aspects of the present disclosure involve creating predictor variables from unstructured data for prediction models are provided. A variable creation application receives unstructured data and processing the unstructured data to generate processed data. Based on the processed data, the variable creation application generates an attribute pool that contains multiple predictor variables generated by applying natural language processing (NLP) procedures on the processed data. The variable creation application further executes a prediction model on at least the predictor variables in the attribute pool to generate a prediction result. Based on the prediction result, the variable creation application evaluates the predictive power of each of the predictor variables and retains predictor variables that are predictive as input predictor variables for the prediction model.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The foregoing, together with other features and examples, will become more apparent upon referring to the following specification, claims, and accompanying drawings.

DETAILED DESCRIPTION

Figure 1:
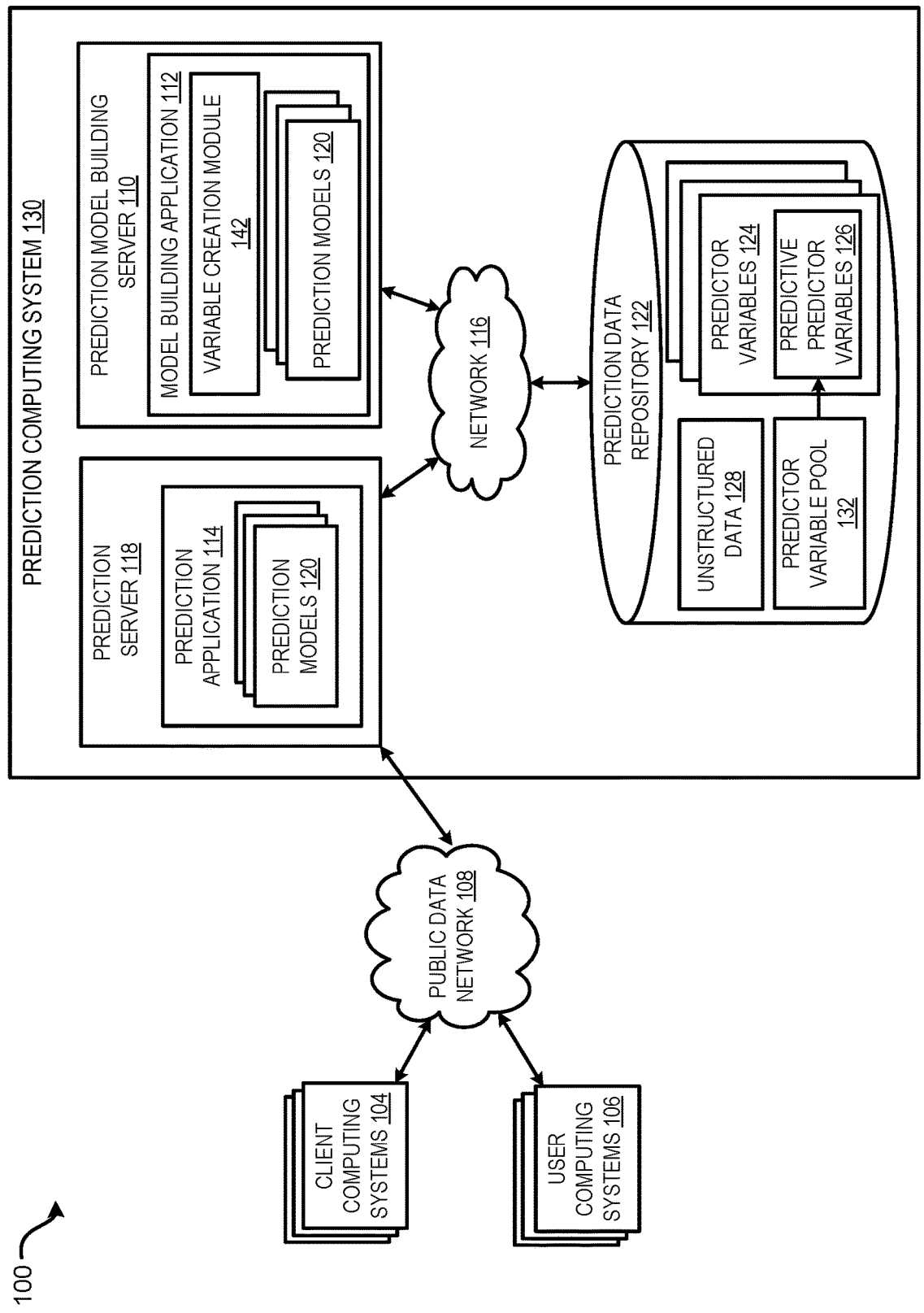
FIG. 1 is a block diagram depicting an example of an operating environment for creating predictive predictor variables for prediction models based on unstructured data, according to certain aspects of the present disclosure.

Certain aspects and features of the present disclosure involve creating predictor variables from unstructured data for prediction models. Natural language processing is utilized to analyze the unstructured data to determine the categories of the content contained in the unstructured data. These categories can be used to generate different predictor variables to form a predictor variable pool. Further information, such as numerical values, named entities can be extracted from the unstructured data and added to the predictor variable pool. The predictor variable pool thus contains candidate predictor variables created for prediction models. Whether a candidate predictor variable is predictive or effective depends on the prediction model for which the predictor variable is used.

For a given prediction model (e.g., a prediction model configured to predict whether a user will use more online computing resources than allocated during a certain time of a day), predictor variables in the predictor variable pool are evaluated by applying the prediction model to the predictor variables to generate prediction results. For example, the prediction power of a predictor variable can be determined by calculating statistics (e.g., statistical significance, Kolmogorov-Smirnov (KS) statistics, or Gini statistics) based on the generated prediction results. If the prediction power of a predictor variable is higher than a threshold value, the predictor variable can be determined to be predictive for the current prediction model and can thus be retained for prediction. If the predictor variable is not predictive, the predictor variable can be archived for future uses. The above process can be repeated for other prediction models to determine predictor variables that are predictive for the respective prediction models. If a prediction is to be made for a target entity or object using a particular prediction model, values of the created predictive predictor variables can be determined and fed into this particular prediction model along with other predictor variables to generate prediction results.

Certain aspects can improve the functionality of software development tools for building machine learning programs or other predictive modeling programs by applying particular rules that transform unstructured data into a training dataset usable for configuring a machine learning program. In these aspects, a particular set of rules is employed in converting unstructured data into a set of training data usable for the training machine-learning models or other prediction models that are implemented via program code. This particular set of rules involve, for example, rules for extracting word embeddings from the unstructured data, rules for determining term-frequency matrix, rules for building models to generate and predict categories from the word embeddings or term-frequency matrix or both, rules for evaluating the predictiveness of a predictor variable, and so on.

Employment of these rules in the transformation of unstructured data to training data can improve the technical feasibility of using information from the unstructured data to configure a machine-learning program or other prediction program. For instance, the technologies presented herein can analyze the unstructured data using natural language processes to identify the content and categories of the information contained in the unstructured data thereby extracting variables from these categories. Further evaluation of the predictiveness of the identified predictor variables allows for the selected predictor variables to be useful to the machine-learning program or other prediction program. Without the proposed technologies, software development tools for training a machine-learning and other prediction models cannot leverage information from unstructured data. Thus, certain aspects can effect improvements to software development tools used to generate machine-learning programs or other prediction programs.

Additionally or alternatively, certain aspects include operations and data structures with respect to machine learning models or other predictive models that improve how computing systems service analytical queries or otherwise update machine-implemented operating environments. In these aspects, a particular set of rules is employed in converting unstructured data into a set of predictor variable data that can be leveraged by a machine-learning program to more accurately assess the risk of allowing access to an interactive computing environment. This particular set of rules involve, for example, rules for extracting word embeddings from the unstructured data, rules for determining term-frequency matrix, rules for building models to generate and predict categories from the word embeddings or term-frequency matrix or both, rules for evaluating the predictiveness of a predictor variable, and so on.

Employment of these rules can allow for more accurate prediction of certain events, which can in turn facilitate the adaptation of an operating environment based on that timing prediction (e.g., modifying an industrial environment based on predictions of hardware failures, modifying an interactive computing environment based on risk assessments derived from the predicted timing of adverse events, etc.). Thus, certain aspects can effect improvements to machine-implemented operating environments that are adaptable based on outputs of machine learning models or other models for predicting events that could impact those operating environments.

Additionally or alternatively, various data transformation tools described herein can improve the manner in which computing systems operate. For instance, software tools that capture data in an unstructured manner (e.g., image processing tools, web crawling tools, system-to-system transfers, word processors) often store this data in a manner that hinders efficient data retrieval or processing. Such data often cannot be integrated into databases or other data structures that impose restrictions on the type of data stored and the manner in which the data is structured for retrieval by software programs. As one example, unstructured data is often incompatible with the input layers of neural networks or with interfaces of other machine-learning models or other predictive models. Thus, existing software development tools could be limited in their capability to use such data for generating or configuring machine-learning programs or other predictive model programs.

Certain aspects described herein can address these problems presented by unstructured data by providing software tools that transform this unstructured data in a manner that facilitates the configuration of machine-learning programs or other predictive programs. This transformation allows a software development tool to configure a machine learning program or other predictive program with increased flexibility by using additional predictor variables from unstructured data than existing tools. Further, various data-transformation tools described herein (e.g., a variable creation module) do not require a programmer to preconfigure a structure to which a user must adapt data entry. Instead, the data-transformation tool provides for the integration, into a software development tool, of unstructured data from various types of application programs. This integration allows the software development tool to leverage the information from unstructured data to build machine learning programs or other predictive modeling programs.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Predictor Variable Creation Operations

Referring now to the drawings, FIG. 1 is a block diagram depicting an example of an operating environment 100 in which a prediction computing system 130 creates predictive predictor variables 126 for a prediction model 120 based on unstructured data 128. FIG. 1 depicts examples of hardware components of a prediction computing system 130, according to some aspects. The prediction computing system 130 is a specialized computing system that may be used for processing large amounts of data using a large number of computer processing cycles. The prediction computing system 130 can include prediction model building server 110 for creating predictor variables from unstructured data 128 as presented herein and building and training prediction models using the created predictor variables along with other predictor variables. The prediction computing system 130 can further include a prediction server 118 for performing predictions based on predictor variables 124 (including the created predictive predictor variables 126) using the prediction models 120.

The prediction model building server 110 can include one or more processing devices that execute program code, such as a model building application 112 or other software development tool. The program code is stored on a non-transitory computer-readable medium. The model building application 112 can execute one or more data-transformation tools, such as a variable creation module 142, to create predictive predictor variables 126 from unstructured data 128. In some aspects, the model building application 112 (or more specifically, the variable creation module 142) can analyze the unstructured data 128 using natural language processing techniques, such as wording embedding, bag-of-words, information extraction, or named entity recognition, to determine categories of the content contained in the unstructured data 128, data contained in the unstructured data 128, or other information. These determined categories and data can be used to generate candidate predictor variables to form a predictor variable pool 132.

For a given prediction model 120, the variable creation module 142 evaluates the predictor variable pool 132 to determine the predictive power of each candidate predictor variable. The prediction model 120 can be any predictive model, such as a neural network model or a logistic regression model, configured to predict an outcome based on input predictor variables. The evaluation can be performed by applying the prediction model 120 on the candidate predictor variables in the predictor variable pool 132 alone or along with other predictor variables previously determined for the prediction model 120. The variable creation module 142 can determine the predictive power of a predictor variable in a univariate sense by calculating statistics such as statistical significance, KS statistics, or Gini statistics based on the prediction results. In some examples, the variable creation module 142 can further perform a multivariate analysis by applying the prediction model 120 on multiple candidate predictor variables or along with other predictor variables previously determined for the prediction model 120. In these cases, statistics such as the statistical significance, KS statistics, or Gini statistics, for the multivariate analysis can also be calculated as the predictive power of the predictor variables. A predictor variable with a predictive power higher than a predictive power threshold can be determined as predictive; otherwise, it can be determined as non-predictive. If the predictive power includes both the statistics for the univariate analysis and the multivariate analysis, both types of statistics need to be higher than the predictive power threshold in order for a predictor variable to be predictive. Those predictive predictor variables 126 are retained for the prediction model 120 and included in the set of predictor variables 124 for the prediction model 120. The variable creation module 142 can repeat the above process for another prediction model to determine the predictive predictor variables 126 for that prediction model from the predictor variable pool 132. The model building application can train the prediction models 120 using the respective predictor variables 124 including the generated predictive predictor variables from unstructured data 128. The training can include, for example, adjusting the parameters of the respective prediction models 120 to minimize a loss function. Additional details regarding creating the predictor variable pool 132 and determining predictive predictor variables 126 from the predictor variable pool 132 are provided below with regard to FIGS. 2-4.

Although in FIG. 1 shows that the variable creation module 142 is included in the model building application 112, the variable creation module 142 can be implemented as a stand-alone program that interacts with the model building application 112 to access the prediction models 120 and to provide the predictive predictor variables 126. By integrating with the variable creation module 142, the model building application 112 can leverage information from unstructured data by transforming unstructured data into a training dataset usable for configuring the prediction models. As such, the functionality of the model building application 112 for building machine learning programs or other predictive modeling programs can be improved.

The unstructured data 128, the predictor variable pool 132, the predictor variables 124 including the predictive predictor variables 126 can be stored in one or more network-attached storage units on which various repositories, databases, or other structures are stored. Examples of these data structures are the prediction data repository 122. Network-attached storage units may store a variety of different types of data organized in a variety of different ways and from a variety of different sources. For example, the network-attached storage unit may include storage other than primary storage located within the prediction model building server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory or memory devices. In some examples, the network-attached storage unit may include a storage unit provided by a cloud environment.

The prediction server 118 can include one or more processing devices that execute program code, such as a prediction application 114. The program code is stored on a non-transitory computer-readable medium. The prediction application 114 can execute one or more processes to utilize the prediction model 120 to generate prediction results based on the predictor variables 124 including the predictive predictor variables 126 determined by the variable creation module 142. For example, if the prediction model 120 is a risk prediction model configured for predicting the risk associated with granting a target entity access to resources, the predictor variables 124 can include the predictor variables determined for the target entity. The generated prediction results can include the risk indicator of the target entity.

Furthermore, the prediction computing system 130 can communicate with various other computing systems, such as client computing systems 104. For example, client computing systems 104 may send prediction requests, such as risk assessment queries, to the prediction server 118 for generating prediction results, or may send signals to the prediction server 118 that control or otherwise influence different aspects of the prediction computing system 130. The client computing systems 104 may also interact with user computing systems 106 via one or more public data networks 108 to facilitate electronic transactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by providers of products or services, such as cloud computing resource providers, online storage resource providers, lenders, or sellers. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a computing device, etc. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronic transactions between the user computing system 106 and the client computing system 104 to be performed.

A user computing system 106 can include any computing device or other communication device operated by a user, such as a consumer or a customer. The user computing system 106 can include one or more computing devices, such as laptops, smartphones, and other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104 or other computing resources, to engage in mobile commerce with a client computing system 104, to obtain controlled access to electronic content hosted by the client computing system 104, etc.

For instance, the user can use the user computing system 106 to engage in an electronic transaction with a client computing system 104 via an interactive computing environment. An electronic transaction between the user computing system 106 and the client computing system 104 can include, for example, the user computing system 106 being used to request online storage space hosted or managed by the interactive computing environment, request online computing resources (such as virtual machines) hosted or managed by the interactive computing environment, and the like. An electronic transaction between the user computing system 106 and the client computing system 104 can also include, for example, query a set of sensitive, secured, or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc., via. A user computing system 106 can be used to request access to the interactive computing environment provided by the client computing system 104, which can selectively grant or deny access to various electronic functions. Based on the request, the client computing system 104 can collect data associated with the customer and communicate with the prediction server 118 for risk assessment using a prediction model 120. Based on the prediction results generated by the prediction server 118, the client computing system 104 can determine whether to grant the access request of the user computing system 106 to certain features of the interactive computing environment.

In a simplified example, the system depicted in FIG. 1 can configure a prediction model 120, such as a neural network, to be used for accurately determining risk indicators, such as credit scores or risk scores indicating the risk of an entity releasing computing/storage resources on time, using predictor variables 124 including the predictive predictor variables 126 created from the unstructured data 128. A predictor variable 124 can be any variable predictive of risk that is associated with an entity. Any suitable predictor variable that is authorized for use by an appropriate legal or regulatory framework may be used.

Examples of predictor variables used for predicting the risk associated with an entity accessing online resources include, but are not limited to, variables indicating the demographic characteristics of the entity (e.g., name of the entity, the network or physical address of the company, the identification of the company, the revenue of the company), variables indicative of prior actions or transactions involving the entity (e.g., past requests of online resources submitted by the entity, the amount of online resource currently held by the entity, and so on.), variables indicative of one or more behavioral traits of an entity (e.g., the timeliness of the entity releasing the online resources), etc. Similarly, examples of predictor variables used for predicting the risk associated with an entity accessing services provided by a financial institute include, but are not limited to, indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc.

The predicted risk indicator can be utilized by the service provider to determine the risk associated with the entity accessing a service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms.

In other examples, the prediction models 120 may be configured to predict hardware failures or other adverse events associated with an interactive computing environment. This type of risk indicators can be utilized to facilitate the adaptation of the computing environment based on the prediction (e.g., modifying an industrial environment based on predictions of hardware failures, modifying an interactive computing environment based on risk assessments derived from the predicted timing of adverse events, etc.).

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. For instance, separate prediction servers may be used to execute different prediction models 120 to generate prediction results based on their respective predictor variables 124. Similarly, devices or systems that are shown as separate, such as the prediction model building server 110 and the prediction server 118, may be instead implemented in a signal device or system.

Examples of Operations Involving Generating Predictive Predictor Variables

Figure 2:
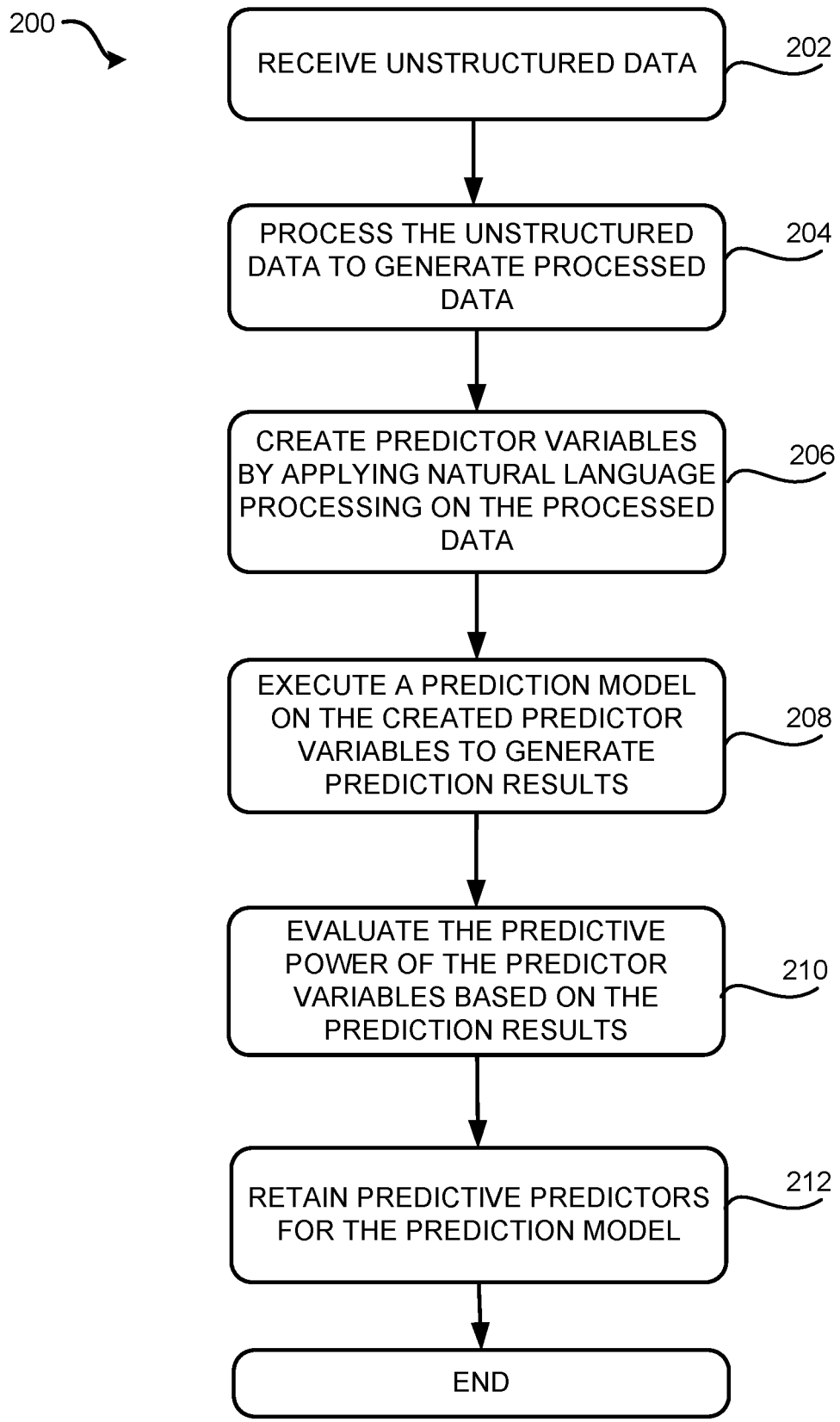
FIG. 2 is a flow chart illustrating an example of a process for generating predictive predictor variables for a prediction model based on unstructured data, according to certain aspects of the present disclosure.

FIG. 2 is a flow chart depicting an example of a process 200 for generating predictive predictor variables 126 for a prediction model 120 based on unstructured data 128. One or more computing devices (e.g., the prediction model building server 110) implement operations depicted in FIG. 2 by executing suitable program code (e.g., model building application 112 or the variable creation module 142). For illustrative purposes, the process 200 is described with reference to certain examples depicted in the figures. Other implementations, however, are possible.

At block 202, the process 200 involves receiving unstructured data 128. In some examples, the prediction models 120 are configured to predict risk or other aspects associated with a user of an online computing resource provider accessing the online computing or storage resources. In these examples, the unstructured data 128 can be received from the online computing resource provider, such as from a client computing system 104 associated with the resource provider. The unstructured data 128 can include, for example, a transcript of service calls made by the users to the resource provider customer service, or emails or other correspondence between the users and customer service representatives. In an example where the prediction models 120 are configured to predict risk or other aspects associated with clients of a bank obtaining a loan or other financial services, the unstructured data 128 can be received from the bank, such as from a client computing system 104 associated with the bank. In this example, the unstructured data 128 can include, for example, transcript of service calls made by the clients to the bank call center, emails or other correspondence between the clients and bank representatives, banking transaction ledgers that contain unstructured content such as the descriptions of transactions performed by the clients, or court documents related to clients' properties or other aspects.

At block 204, the process 200 involves processing the unstructured data 128 to generate processed data. The processing can include normalizing the unstructured data 128 to remove unneeded characters, add text data that were missing or omitted in the unstructured data 128, normalize the text data so that they are consistent in the unstructured data 128, and others. In some examples, the variable creation module 142 can normalize the unstructured data 128 by using one or more tools such as the context-independent normalization, context-dependent normalization, stemming and lemmatization, tokenization, stop word filtering, and so on. The context-independent normalization can include removing the special characters and excess whitespace in the unstructured data 128 and converting the text in the unstructured data 128 to a common case, such as a lower case or an upper case. The context-dependent normalization can include the expansion of abbreviations, contractions, and numerical words in the unstructured data 128. The stemming process includes removing the suffixes of a word via a rule-based approach. The lemmatization process includes converting a word into its canonical form by analyzing the word against vocabulary. The tokenization can include separating the text into individual words and removing punctuation marks. The stop word filtering process involves removing stop words that are commonly used but irrelevant for text analysis, such as "the," "and," "it," and "what" in English. These processes for normalizing the unstructured data 128 are provided for illustration purposes only and should not be construed as limiting. Various other processes can be utilized to prepare the unstructured data 128 for further processing.

Figure 3:
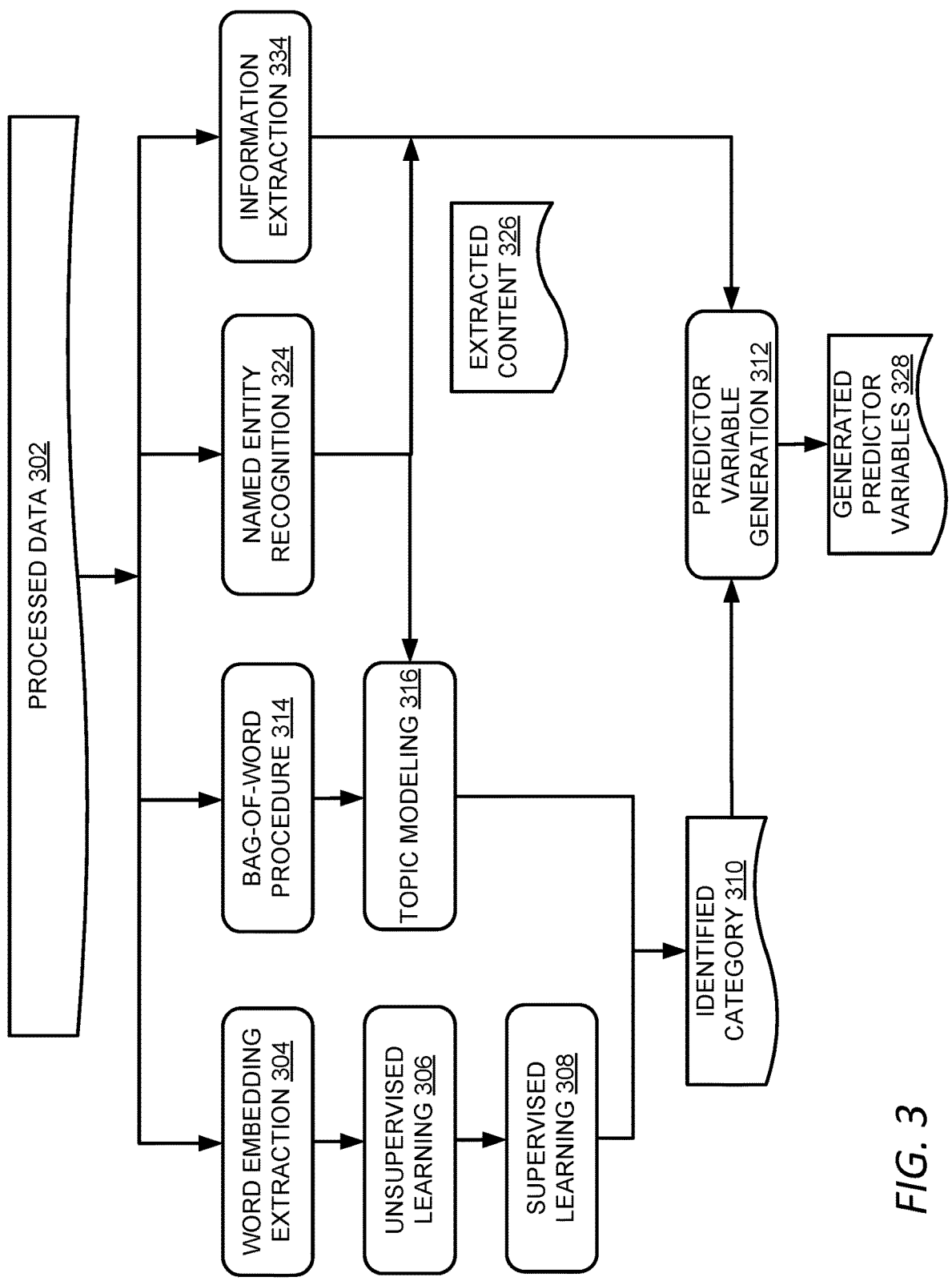
FIG. 3 is a block diagram illustrating an example of creating predictor variables based on the processed data, according to certain aspects of the present disclosure.

At block 206, the process 200 involves creating predictor variables by applying one or more natural language processing (NLP) procedures on the processed data. FIG. 3 shows a block diagram illustrating an example of creating predictor variables based on the processed data 302. In the example shown in FIG. 3, one or more of the following NLP procedures can be employed: the word embedding extraction procedure 304, the bag-of-word procedure 314, the named entity recognition procedure 324, and the information extraction procedure 334.

The word embedding extraction procedure 304 involves extracting word embedding from the unstructured data 128. A word embedding is a dense, low-dimensional, real-valued vector representation of a word in a text corpus, such as the processed data of the unstructured data 128. The dimension of the vector is smaller, and sometimes much smaller, than the vocabulary size in the corpus. The word embedding encodes similarity in words in a syntactic and semantic sense, which makes it possible to predict groups of related words or infer new words from other words with contextual words removed or added. As such, the presence of the contextual words on the main word influences the final word embedding.

The word embedding of a word can be generated by using a word embedding model. The word embedding model can be built by combining the word representations of a vocabulary. This word embedding model can be trained by using a neural network model (e.g., a neural network with one or more hidden layers) in which a target word and its context are fed as input to the model. The context of the target word can include the words that appear close to the target word, such as the words next to the target word or the words less than N words away from the target word. N is a natural number and is configurable. The output of the word embedding model can include real-valued vectors that include the representation of the target word relative to its surrounding context. The representation of a target word is more accurate if the target word is observed within its typical context.

To generate the word embedding for the processed data 302, the variable creation module 142 can feed each word of the processed data 302 into the word embedding model along with the context of the word. The output of the word embedding extraction procedure 304 can include a matrix with W rows. Each of the W rows contains a representation vector with a length L for a word of the processed data 302.

The generated word embeddings for the words in the processed data 302 can be further provided to an unsupervised learning procedure 306. The unsupervised learning procedure 306 can identify categories of word embeddings that are similar to each other. For example, the unsupervised learning procedure 306 can employ a clustering algorithm to generate categories such as a category for resource increase query, a category for resource increase request in the computing resource example, or a category for the payment plan, a category for autopay, or a category for income direct deposits in the financial service example.

These categories of word embeddings can be utilized by a supervised learning procedure 308 to classify additional word embeddings into each of these categories. For example, the supervised learning procedure 308 can employ a clustering algorithm, a regression algorithm, or a neural network to classify a word embedding into one of the categories identified by the unsupervised learning procedure 306. In some implementations, the processed data 302 is divided into two sets. The first set is used in the unsupervised learning procedure 306 to identify possible categories for the processed data 302. The supervised learning procedure 308 is then applied to classify the second set of data to different categories 310.

Based on the identified categories 310, the variable creation module 142 can employ a predictor variable generation procedure 312 to generate predictor variables 328. In the above online computing resource example, the predictor variable generated for the category for resource increase query can include the number of times a user has queried about how to increase resources beyond the allocated quota. The predictor variables generated for the category for resource increase request can include the number of times a user has requested to increase resources and the amount of resource increase in the requests. In the above financial service example, the predictor variable generated for the category for payment plan can include the number of times a user has been classified as participating in a payment plan. The predictor variable generated for the category for autopay can include whether the user is classified into the auto pay category. Similarly, the predictor variable generated for the category for income direct deposits can include whether the user is classified into the income direct deposit category. These generated predictor variables 328 can be included in a predictor variable pool 132 containing the created candidate predictor variables.

The bag-of-word procedure 314 involves extracting a term-frequency (TF) matrix from the unstructured data 128. The TF matrix can include R rows and C columns with each row representing a document (e.g., a segment of the processed data 302) and each column representing a word. An element (i,j) in the TF matrix represents the occurrence of the word j in document i. In some implementations, each element in the TF matrix is normalized by calculating a weighted count of words in a document in which the raw count of the words in the document is weighted by the count of the words across the entire corpus (i.e., the processed data 302).

Based on the TF matrix, the variable creation module 142 employs a topic modeling procedure 316 to identify topics or categories contained in the processed data 302. Specifically, the topic modeling procedure 316 can employ a topic model, such as a Latent Dirichlet Allocation (LDA) model, to identify the topics or groupings of the processed data 302. From the input, such as the TF matrix generated by the bag-of-words procedure 314, the topic model can classify text in a document to a specific topic. The result is either a topic per document model (i.e., generating a topic for an input document) or a word per topic model (e.g., outputting a word for each topic). In some examples, the topic modeling is an unsupervised learning process. The generated topic model can be used to classify other documents, which can be a supervised learning process.

Other information identified from the processed data 302 can also be utilized to determine the topics for the processed data 302. For example, the named entity recognition procedure 324 can be utilized to identify frequently-occurring or important entities from the processed data 302. These identified entities can be incorporated into the TF matrix to facilitate the topic modeling process, for example, by adding more weights to the words representing the entities. Based on the identified topics or topic words, categories 310 can be generated, for example, by mapping one topic to one category 310.

As described above, both the word embedding extraction procedure 304 (along with the unsupervised learning procedure 306 and the supervised learning procedure 308) and the bag-of-words procedure 314 (along with the topic modeling procedure 316) can be utilized to identify categories 310. In some implementations, both procedures are executed and the identified categories 310 from these two procedures are consolidated, such as by removing duplicate categories. In other implementations, only one of these two procedures is selected for generating the identified categories 310. The selection can be determined, for example, based on the predictive powers of the predictor variables. Additional details in this regard will be presented below with regard to FIG. 4.

The variable creation module 142 can further extract content from the processed data 302 through an information extraction procedure 334. The information extraction procedure 334 involves extracting content 326 such as numerical data (e.g., account numbers, IP addresses, storage space values, monetary values, time, and dates), or entities (e.g., proper names, organizations, and industry sectors). These data can be identified by applying heuristics based upon contextual data or statistical named-entity recognition models trained with tagged text corpora. These data can be fed into the predictor variable generation procedure 312 to generate the predictor variables for inclusion in the predictor variable pool 132.

Referring back to FIG. 2, at block 208, the process 200 involves executing a prediction model 120 on the candidate predictor variables contained in the predictor variable pool 132 to generate prediction results. The variable creation module 142 can apply the prediction model 120 to the candidate predictor variables only or in conjunction with other predictor variables 124 that have been selected for the prediction model 120. At block 210, the process 200 involves evaluating the predictive power of the candidate predictor variables based on the prediction results.

In some examples, the evaluation of the predictive power of each new predictor variable is performed at a univariate level with the dependent variable via statistics such as statistical significance, KS statistics, and/or Gini statistics. The univariate analysis can also be combined with multivariate analysis where the new predictor variables are used as predictors in the prediction model 120, such as a logistic regression model or a neural network model, along with other predictor variables for the prediction model 120. Combining the univariate and modeling results, a comprehensive view of the new predictor variables' performance and predictive power can be obtained.

For example, the variable creation module 142 can apply a logistic regression model on the new predictor variables. The variable creation module 142 can calculate the univariate statistics such as statistical significance, KS statistics, and/or Gini statistics for each of the predictor variables. In some cases, a linear relationship between the prediction result of a prediction model 120 and the input predictor variable is enforced for regulation-compliance purposes. In that case, an investigation can be performed to determine if the relationship between the predictor variable and the prediction result can be expressed in a linear relationship. If so, the variable creation module 142 can continue the following evaluation for the predictor variable; otherwise, the predictor variable can be marked as nonpredictive.

The prediction model 120 can be used to generate the prediction results, such as the likelihood of a user using more computing resources than allocated or the likelihood of a consumer going 90 days past due on an auto loan product using only the created candidate predictor variables in the predictor variable pool in a multivariate manner. The prediction model 120 can be further used to generate the prediction results based on the candidate predictor variables and other predictor variables in a multivariate manner. These prediction results can be used to evaluate the predictiveness of the predictor variables in a multivariate manner.

Depending on how the predictiveness of the predictor variables are evaluated, statistics from the univariate and multivariate analysis can be used to determine if the predictor variables are predictive or not. For example, if the univariate analysis is used to evaluate the predictiveness of a predictor variable, the predictor variable is considered predictive if the statistics of the predictor variable satisfy a criterion for predictiveness in a univariate sense. For example, the statistical significance value P of the predictor variable is less than a threshold value (e.g., 0.05), the KS statistics is higher than a value of threshold (e.g., 30) or the Gini statistics is higher than a threshold value (e.g., 40). If the multivariate analysis is used to evaluate the predictiveness of the predictor variables, predictor variables are considered predictive if the multivariate statistics of the predictor variables are higher than a threshold value. The above evaluation process can be repeated if the prediction model 120 is built using a neural network instead of the logistic regression model.

At block 212, the variable creation module 142 can retain the candidate predictor variables that are determined to be predictive and include these predictive predictor variables 126 into the predictor variables 124 used for the prediction model 120. The candidate predictor variables that are determined to be not predictive for the prediction model 120 can be archived along with its corresponding statistics. These archived predictor variables can be evaluated for other prediction models 120 or to be analyzed later as more unstructured data are received that may enhance the predictive power of the predictor variables. The model building application 112 can use the predictor variables 124 to further train the prediction models 120.

The trained prediction model 120 can be used by the prediction server 118 to serve prediction requests based on the predictor variables 124 including the predictive predictor variables 126. For example, the prediction model 120 can be a model configured to predict a risk indicator indicating the risk associated with granting a customer's access to an interactive computing environment as illustrated in FIG. 1. In this example, a customer can submit a request to access the interactive computing environment using a user computing system 106. Based on the request, the client computing system 104 can generate and submit a risk assessment query for the customer to the prediction server 118. The risk assessment query can include, for example, an identity of the customer and other information associated with the customer that can be utilized to generate the predictor variables 124. The prediction server 118 can perform a risk assessment based on predictor variables 124 generated for the customer and return the predicted risk indicator to the client computing system 104.

Based on the received risk indicator, the client computing system 104 can determine whether to grant the customer access to the interactive computing environment. If the client computing system 104 determines that the level of risk associated with the customer accessing the interactive computing environment and the associated financial service is too high, the client computing system 104 can deny access by the customer to the interactive computing environment. Conversely, if the client computing system 104 determines that the level of risk associated with the customer is acceptable, the client computing system 104 can grant access to the interactive computing environment by the customer and the customer would be able to utilize the various services provided by the service provider. For example, with the granted access, the customer can utilize the user computing system 106 to access web pages or other user interfaces provided by the client computing system 104 to execute programs, store data, or query data, submit an online digital application, operate electronic tools, or perform various other operations within the interactive computing environment hosted by the client computing system 104.

Figure 4:
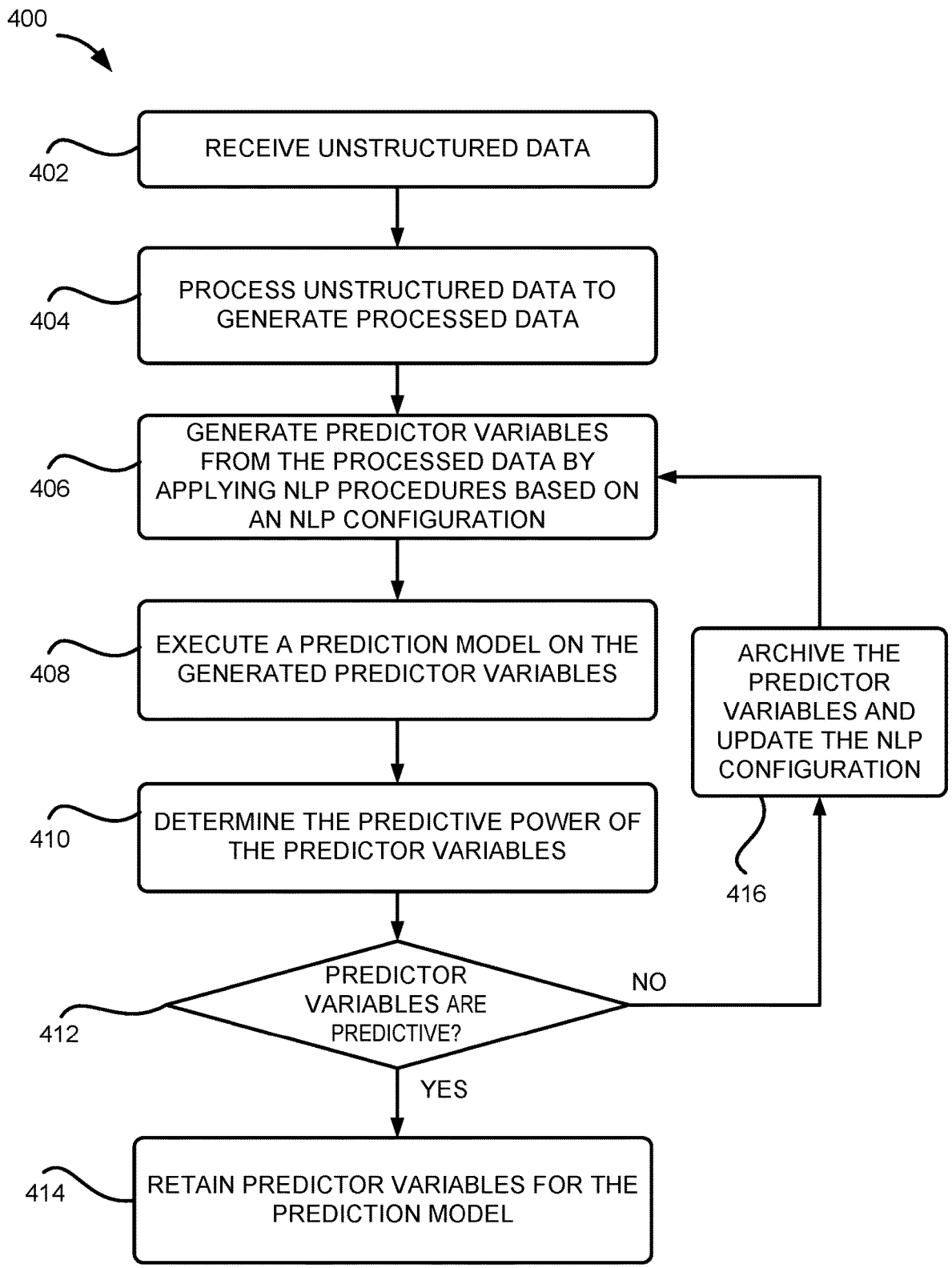
FIG. 4 is a flow chart depicting another example of a process for generating predictor variables for a prediction model based on unstructured data, according to certain aspects of the present disclosure.

Referring now to FIG. 4, a flow chart depicting another example of a process 400 for generating predictor variables for a prediction model 120 based on unstructured data 128 is presented. One or more computing devices (e.g., the prediction model building server 110) implement operations depicted in FIG. 4 by executing suitable program code (e.g., model building application 112 or the variable creation module 142). In this example, an NLP configuration is employed to determine which NLP procedure(s) are utilized to create the candidate predictor variables. At block 402, the process 400 involves receiving the unstructured data 128. At block 404, the process 400 involves processing the unstructured data 128 to generate processed data 302. Operations performed in blocks 402 and 404 are similar to those performed in blocks 202 and 204, respectively, as described above with respect to FIG. 2.

At block 406, the process 400 involves generating the predictor variables 328 from the processed data 302 by applying NLP procedures based on an NLP configuration. In some examples, the NLP configuration specifies which NLP procedure(s) should be used to generate the predictor variables. For instance, the NLP configuration can specify that the procedures involving the word embedding extraction, i.e., the procedures 304-308, should be used to generate the predictor variables 328 without using other NLP procedures, such as the procedures 314-334. In another example, the NLP configuration may specify that the procedures involving the bag-of-words procedure 314 and the topic modeling procedure 316 are to be utilized to generate the predictor variables along with the named entity recognition procedure 324, but not the information extraction procedure 334. The NLP configuration may specify other combinations of the NLP procedures.

According to the NLP configuration, the variable creation module 142 can utilize the NLP procedures specified in the NLP configuration to generate the predictor variables 328. The respective NLP procedures can be performed in a way similar to that described above with regard to FIG. 3. At block 408, the process 400 involves executing a prediction model 120 on the predictor variables 328. At block 410, the process 400 involves determining the predictive power of the predictor variables 328. Operations performed in blocks 408 and 410 are similar to those performed in blocks 208 and 210, respectively, as described above with respect to FIG. 2.

At block 412, the process 400 involves determining whether the predictor variables are predictive. In some examples, the determination is made at an individual predictor variable level. As described above in detail with regard to block 210 of FIG. 2, a predictor variable is predictive if the univariate statistics of the predictor variable satisfies a criterion, such as the statistical significance value P is less than a threshold value (e.g., 0.05), the KS statistics is higher than a value of threshold (e.g., 30) or the Gini statistics is higher than a threshold value (e.g., 40).

To determine whether the created predictor variables are predictive for the prediction model 120, the predictive power of the predictor variables can also be evaluated at a group level. For example, the created predictor variables are predictive if the number of predictor variables that are determined to be predictive is higher than a threshold number. If the created predictor variables are predictive, the process 400 involves, at block 414, retaining the predictor variables that are determined to be predictive and including these predictor variables in the predictor variables 124 for the prediction model 120.

If the created predictor variables are not predictive, the process 400 involves, at block 416, archiving the predictor variables and updating the NLP configuration to specify a different combination of NLP procedures used for generating the predictor variables 328. The process 400 further involves generating a new set of predictor variables based on the updated NLP configuration. By utilizing different NLP configurations, more predictive predictor variables can be created for the prediction model 120.

Example of Computing System for Predictor Variable Creation

Figure 5:
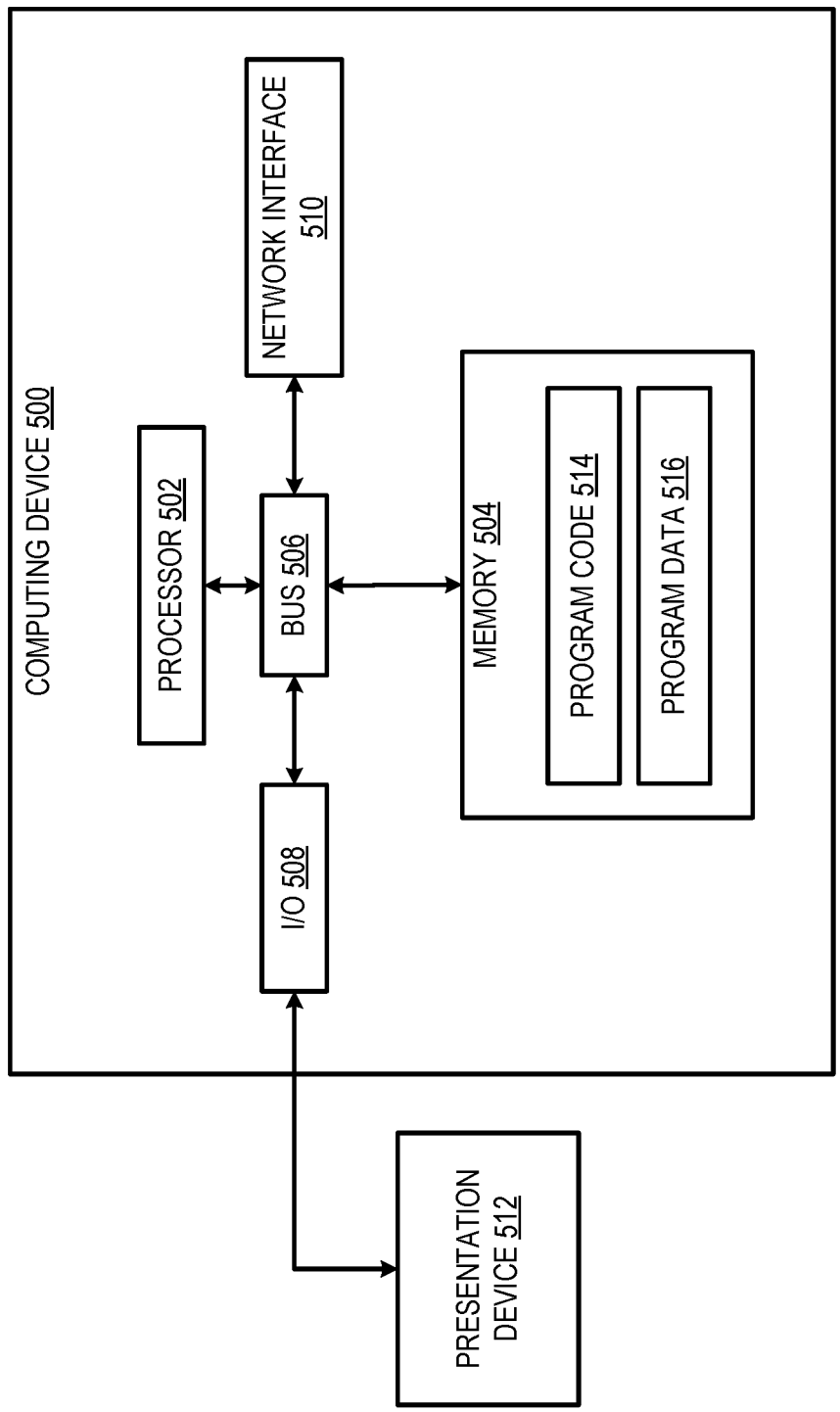
FIG. 5 is a block diagram depicting an example of a computing system suitable for implementing aspects of the techniques and technologies presented herein.

Any suitable computing system or group of computing systems can be used to perform the operations for creating predictor variables from unstructured data as described herein. For example, FIG. 5 is a block diagram depicting an example of a computing device 500, which can be used to implement the prediction server 118 or the prediction model building server 110. The computing device 500 can include various devices for communicating with other devices in the operating environment 100, as described with respect to FIG. 1. The computing device 500 can include various devices for performing one or more transformation operations described above with respect to FIGS. 1-4.

The computing device 500 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 500 may also include a number of external or internal devices such as input or output devices. For example, the computing device 500 is shown with an input/output interface 508 that can receive input from input devices or provide output to output devices. A bus 506 can also be included in the computing device 500. The bus 506 can communicatively couple one or more components of the computing device 500.

The computing device 500 can execute program code 514 that includes the prediction application 114, the model building application 112, and/or the variable creation module 142. The program code 514 for the prediction application 114, the model building application 112, and/or the variable creation module 142 may be resident in any suitable computer-readable medium and may be executed on any suitable processing device. For example, as depicted in FIG. 5, the program code 514 for the prediction application 114, the model building application 112, and/or the variable creation module 142 can reside in the memory 504 at the computing device 500 along with the program data 516 associated with the program code 514, such as the predictor variables 124, the predictive predictor variables 126, the unstructured data 128, and the predictor variable pool 132. Executing the prediction application 114, the model building application 112, and/or the variable creation module 142 can configure the processor 502 to perform the operations described herein.

In some aspects, the computing device 500 can include one or more output devices. One example of an output device is the network interface device 510 depicted in FIG. 5. A network interface device 510 can include any device or group of devices suitable for establishing a wired or wireless data connection to one or more data networks described herein. Non-limiting examples of the network interface device 510 include an Ethernet network adapter, a modem, etc.

Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client-computing device that communicates with the computing device 500 using one or more data networks described herein. In other aspects, the presentation device 512 can be omitted.

General Considerations

Numerous specific details are set forth herein to provide a thorough understanding of the claimed subject matter. However, the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other types of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that alterations to, variations of, and equivalents to such aspects may be produced. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A computer-implemented method in which one or more processing devices performs operations comprising:
   accessing unstructured data;
   determining a natural language processing (NLP) configuration;

generating a first set of NLP procedures based on the natural language processing configuration;

generating a plurality of predictor variables by applying the first set of NLP procedures on the unstructured data;

generating an attribute pool that comprises the generated plurality of predictor variables;

executing a machine-learning prediction model on at least the plurality of predictor variables in the attribute pool to generate a prediction result;

evaluating a predictive power of each of the plurality of predictor variables based on the prediction result;

updating the NLP configuration;

generating one or more additional NLP procedures not present in the first set of NLP procedures;

generating one or more additional predictor variables by applying the one or more additional NLP procedures;

adding to the attribute pool at least one of the generated one or more additional predictor variables containing a predictive power higher than the predictive power of at least one of the plurality of predictor variables;

retaining at least one predictor variable from the predictor variables within the attribute pool that is predictive as an input predictor variable for the machine-learning prediction model;

training the machine-learning prediction model trained using predictor variables comprising the at least one predictor variable; and transmitting, to a remote computing device, a risk indicator for a target entity generated by the trained machine-learning prediction model, wherein the risk indicator is usable for controlling access to one or more interactive computing environments by the target entity.

2. The computer-implemented method of claim 1, further comprising, prior to applying any NLP procedure on the unstructured data, processing the unstructured data by applying one or more of:
a context-independent normalization process;
a context-dependent normalization process;
a tokenization process;
a stop word filtering process; or
a stemming and lemmatization process.

3. The computer-implemented method of claim 1, wherein the one or more NLP procedures used to generate any predictor variable comprises at least one of a word embedding procedure, a bag-of-word procedure, a named entity recognition procedure, or an information extraction procedure.

4. The computer-implemented method of claim 1, wherein the operations further comprise:
executing the machine-learning prediction model on the additional predictor variables in the attribute pool to generate additional prediction results.

5. The computer-implemented method of claim 1, wherein a predictor variable is predictive if the predictive power of the predictor variable satisfies a criterion for predictiveness and is otherwise not predictive.

6. The computer-implemented method of claim 1, wherein the predictive power of a predictor variable is determined by calculating statistics based on prediction results, the statistics comprising one or more of statistical significance, Kolmogorov-Smirnov (KS) statistics, or Gini statistics.

7. The computer-implemented method of claim 6, wherein a predictor variable is predictive if the calculated statistics of the predictor variable satisfies a criterion for predictiveness determined by a threshold value of the statistics.

8. A system for generating predictor variables from unstructured data, the system comprising:
one or more processing device; and
one or more non-transitory computer-readable medium communicatively coupled to the one or more processing device, wherein the one or more processing devices are configured to execute program code stored in the non-transitory computer-readable medium and thereby perform operations comprising:
processing the unstructured data to generate processed data;
determining a natural language processing (NLP) configuration;
generating a first set of NLP procedures based on the natural language processing configuration;
generating a plurality of predictor variables by applying the first set of NLP procedures on the unstructured data;
generating an attribute pool that comprises the generated plurality of predictor variables;
executing a prediction model on at least the plurality of predictor variables in the attribute pool to generate a prediction result;
evaluating a predictive power of each of the plurality of predictor variables based on the prediction result;
updating the NLP configuration;
generating one or more additional NLP procedures not present in the first set of NLP procedures;
generating one or more additional predictor variables by applying the one or more additional NLP procedures;
adding to the attribute pool at least one of the generated one or more additional predictor variables; and
retaining at least one predictor variable from the predictor variables within the attribute pool as an input predictor variable for the prediction model.

9. The system of claim 8, wherein processing the unstructured data comprises applying one or more of:
a context-independent normalization process;
a context-dependent normalization process;
a tokenization process;
a stop word filtering process; or
a stemming and lemmatization process.

10. The system of claim 8, wherein the one or more NLP procedures used to generate any predictor variable comprises at least one of a word embedding procedure, a bag-of-word procedure, a named entity recognition procedure, or an information extraction procedure.

11. The system of claim 8, wherein the operations further comprise:
training a machine-learning prediction model trained using predictor variables comprising the at least one predictor variable; and
transmitting, to a remote computing device, a risk indicator for a target entity generated by the trained machine-learning prediction model, wherein the risk indicator is usable for controlling access to one or more interactive computing environments by the target entity.

12. The system of claim 11, wherein a predictor variable is predictive if the predictive power of the predictor variable satisfies a criterion for predictiveness and is otherwise not predictive.

13. The system of claim 8, wherein the predictive power of a predictor variable is determined by calculating statistics based on prediction results, the statistics comprising one or more of statistical significance, Kolmogorov-Smirnov (KS) statistics, or Gini statistics.

14. A non-transitory computer-readable medium having instructions stored thereon that are executable by a processor to causing a computing device to perform operations, the operations comprising:
   accessing unstructured data;
   processing the unstructured data to generate processed data;
   determining a natural language processing (NLP) configuration;
   generating a first set of NLP procedures based on the natural language processing configuration;
   generating a plurality of predictor variables by applying the first set of NLP procedures on the unstructured data;
   generating an attribute pool that comprises the generated plurality of predictor variables;
   executing a prediction model on at least the plurality of predictor variables in the attribute pool to generate a prediction result;
   evaluating a predictive power of each of the plurality of predictor variables based on the prediction result;
   updating the NLP configuration;
   generating one or more additional NLP procedures not present in the first set of NLP procedures;
   generating one or more additional predictor variables by applying the one or more additional NLP procedures;
   adding to the attribute pool at least one of the generated one or more additional predictor variables containing a predictive power higher than the predictive power of at least one of the plurality of predictor variables; and
   retaining at least one predictor variable from the predictor variables within the attribute pool that is predictive as an input predictor variable for the prediction model.

15. The non-transitory computer-readable medium of claim 14, wherein processing the unstructured data comprises applying one or more of:
   a context-independent normalization process;
   a context-dependent normalization process;
   a tokenization process;
   a stop word filtering process; or
   a stemming and lemmatization process.

16. The non-transitory computer-readable medium of claim 14, wherein the one or more NLP procedures used to generate the plurality of predictor variables comprises at least one of a word embedding procedure, a bag-of-word procedure, a named entity recognition procedure, or an information extraction procedure.

17. The non-transitory computer-readable medium of claim 16, wherein the operations further comprise:
   training a machine-learning prediction model trained using predictor variables comprising the at least one predictor variable; and
   transmitting, to a remote computing device, a risk indicator for a target entity generated by the trained machine-learning prediction model, wherein the risk indicator is usable for controlling access to one or more interactive computing environments by the target entity.

18. The non-transitory computer-readable medium of claim 17, wherein a predictor variable is predictive if the predictive power of the predictor variable satisfies a criterion for predictiveness and is otherwise not predictive.

19. The non-transitory computer-readable medium of claim 14, wherein the predictive power of a predictor variable is determined by calculating statistics based on prediction results, the statistics comprising one or more of statistical significance, Kolmogorov-Smirnov (KS) statistics, or Gini statistics.

20. The non-transitory computer-readable medium of claim 19, wherein a predictor variable is predictive if the calculated statistics of the predictor variable satisfies a criterion for predictiveness determined by a threshold value of the statistics.

* * * * *